Nov. 28, 1939.   C. E. BRADSHAW   2,181,546
VEHICLE BODY MOUNTING
Filed Aug. 27, 1938   2 Sheets-Sheet 2
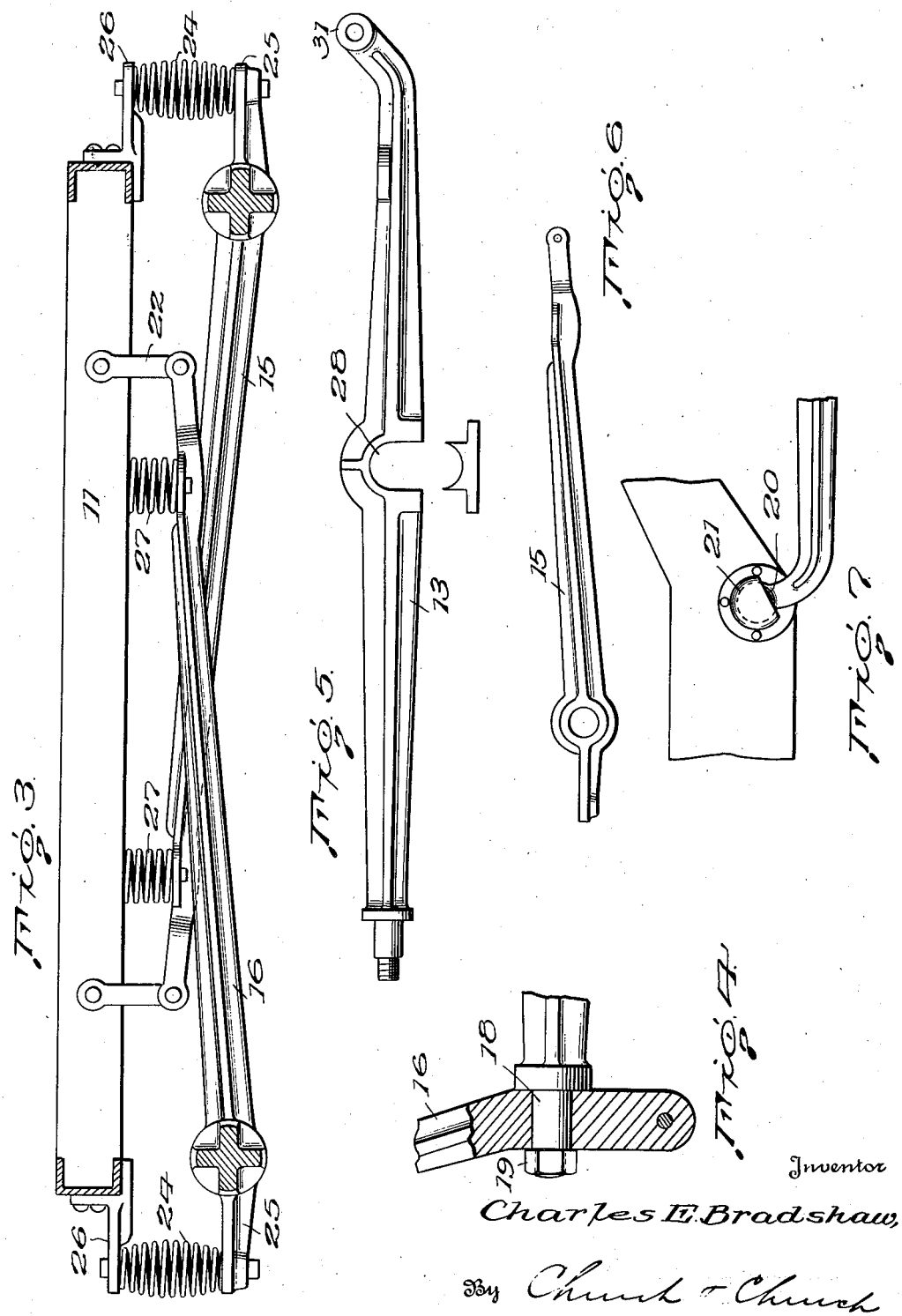
Inventor
Charles E. Bradshaw,
By Church & Church
His Attorneys Patented Nov. 28, 1939

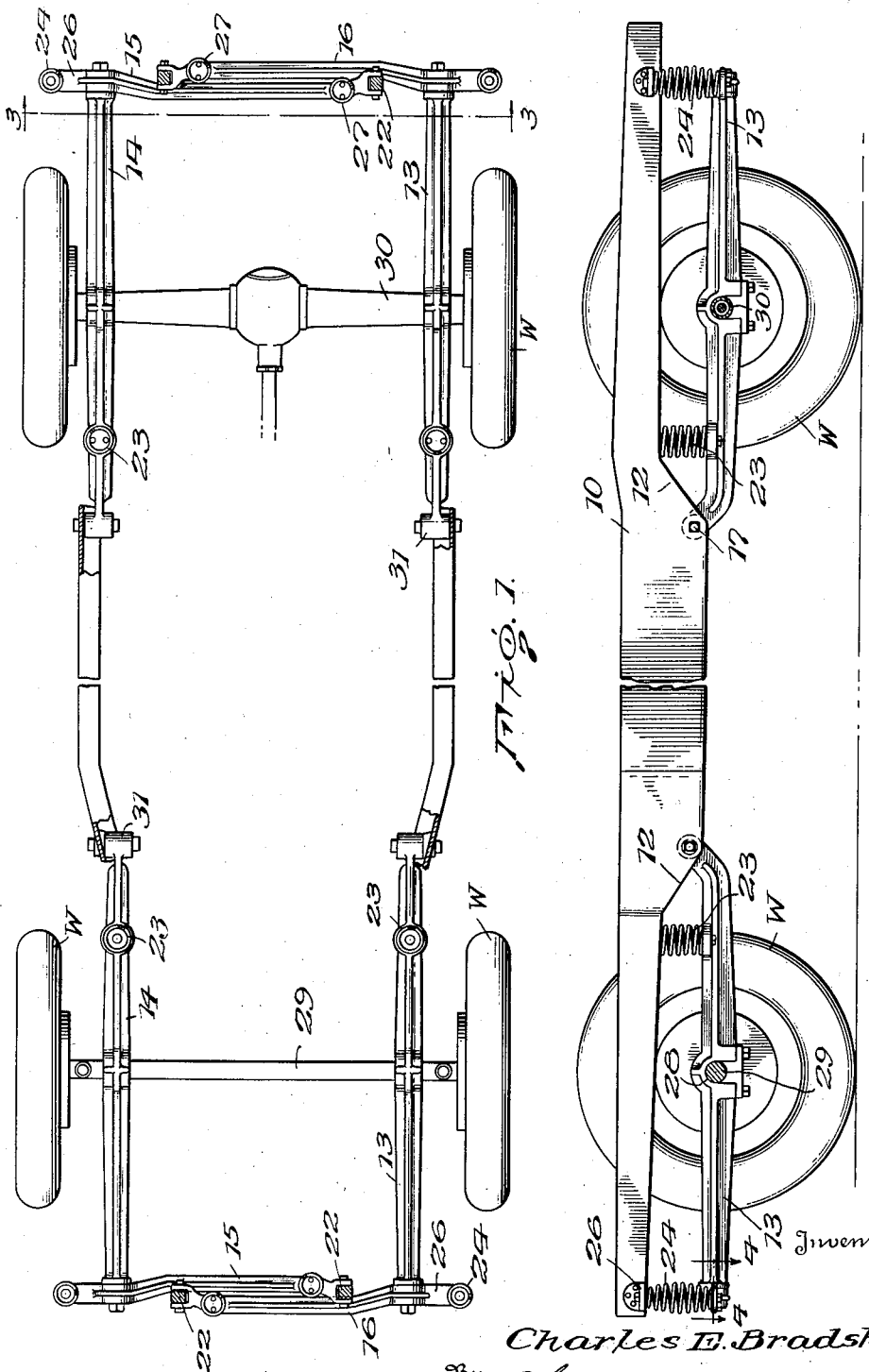

2,181,546

UNITED STATES PATENT OFFICE 2,181,546

VEHICLE BODY MOUNTING

Charles E. Bradshaw, Wellville, Va., assignor of one-third to Charles Martin, Wellville, Va.

Application August 27, 1938, Serial No. 227,189

4 Claims. (Cl. 280—124)

This invention relates to improvements in vehicles and, particularly, to the vehicle frame and the means for supporting the same on the usual ground wheels. The invention is especially adapted for automotive vehicles although, in no sense, confined thereto.

The primary object of the invention is the production of a construction or mounting which, while possessing the elements of simplicity, strength and durability will, nevertheless, function with maximum efficiency to yieldingly support the vehicle frame and relieve the vehicle from strains due to irregularities in the roadway over which the vehicle is traveling.

A further object of the invention is to provide an auxiliary or supplemental frame at the front and at the rear of the vehicle frame or chassis, one of which frames will carry the front ground wheels and the other the rear ground wheels. Each frame is so constructed that any one of the ground wheels, fore or aft, may be displaced vertically by irregularities in the roadway, without materially or noticeably altering the horizontal plane in which the chassis is located.

With these and other objects in view, the invention consists in certain details of construction and combinations and arrangements of parts, all as will hereinafter be more fully described, and the novel features thereof particularly pointed out in the appended claims.

In the accompanying drawings—

Figure 1 is a top plan view of the present auxiliary or supplemental frames assembled on the vehicle chassis, the end portions of the chassis being broken away to facilitate illustration of the supplemental frames;

Fig. 2 is a side elevational view of the chassis with supplemental frames assembled therewith;

Fig. 3 is a transverse vertical section on the line 3—3 of Fig. 1;

Fig. 4 is a horizontal sectional view on the line 4—4 of Fig. 2;

Fig. 5 is a detail side elevation of one of the side arms or links of the supplemental frame;

Fig. 6 is a similar view of one of the transverse links of the supplemental frame; and Fig. 7 is a detail view illustrating a form of universal joint that may be utilized in attaching the side links or arms of the supplemental frame to the chassis.

The body of the vehicle (not shown) is adapted to be supported on the vehicle frame or chassis in any suitable manner, but the construction of the body and mode of mounting the same on the chassis form no part of the present invention.

As illustrated, the chassis preferably comprises side sills or members 10 rigidly connected together by transverse members 11 at their forward and rear ends. As the construction of the auxiliary frames for both the front and rear wheels are identical and, as the manner in which those frames are assembled with the chassis is also alike, a detailed description of one frame and its mounting will suffice for a complete understanding of the present invention.

Referring to Figs. 1 and 2, the side sills 10 of the chassis are preferably offset at their end portions, the lower portions of the sills being cut away, as at 12. Each auxiliary frame comprises two side arms or links 13, 14, and two end or transverse links or arms 15, 16. The side arms or links are preferably arranged in the same vertical planes as the side sills 10, with one end of each side link or arm pivotally connected, as at 17, to one of the side sills near the lower edge thereof at a point where the offset end portion 12 merges into the intermediate portion of the sill. The opposite ends of these side arms 13, 14, project toward the ends of the vehicle or chassis, and at the end of the chassis, they are pivotally connected to the transverse arms 15, 16. As shown in Fig. 4, each side arm may be provided with a reduced end portion 18 on which the transverse arms are pivotally supported, being retained thereon as by nuts 19. The ends of the side arms attached to the sills may be pivoted to the sills by bearing sleeves 31 retained in any suitable manner on pivot pins secured in the sills or, if desired, these ends of the side arms may be formed with a ball 20 adapted to engage in socket members 21 on the side sills, thus affording a ball and socket joint and a universal motion for the side arms.

The transverse arms 15, 16, pivoted to what might be termed the free ends of the side arms, project from the side of the vehicle at which they are pivoted to a point beyond the longitudinal center of the chassis, the two arms thus crossing one another. The end of each transverse arm 15, 16 thus located beyond the longitudinal center of the chassis is connected to the cross member 11, a link 22 being used, if desired, by being pivotally connected to the transverse arm and to the cross member. As will be apparent from the following description, this particular form of connection for these ends of the transverse arms is not necessary.

Interposed between each side arm 13, 14, and the side sills of the chassis, are springs 23, these springs being located, preferably, quite close to the pivotal connection between the side arms and the side sills. Also interposed between the chassis and the supplemental frames, at the points where the side and transverse arms of the frames are pivoted together, are coil springs 24, the transverse arms preferably being provided with extensions 25, and the chassis with brackets 26 for attachment of these springs 24. Additional springs 27 are also interposed between the end member 11 of the chassis and those portions of the transverse arms 15, 16, projecting beyond the longitudinal center of the vehicle. Thus, the chassis is yieldingly supported with respect to the auxiliary frames at each of its ends.

Each of the side arms 13, 14, is provided with a recess 28 in which the ground wheels W are supported. In the case of the forward ground wheels, the axle 29 is clamped in the recesses 28 and, in the case of the rear or driving wheels, the axle housing 30 is clamped in the side arms of the under-frame. Any desired form of clamping device may be utilized for securing the axle or axle housing in the recesses in the side arms. In connection with both sets of wheels, it will be observed from an inspection of Fig. 2 that the springs 23 are located between the axles carried by the side arms and the point at which the respective arms are pivotally attached to the side sills of the chassis, the springs, as previously noted, being located rather close to the point of attachment of the side arms to the sills. In this connection, it will also be observed in Fig. 3 that the springs 27 are located between the ends of their respective links and the longitudinal center of the chassis.

With this arrangement, the springs 23, between the side arms extending longitudinally of the chassis, and the side sills of the chassis, are adapted to primarily carry the "dead load", or the weight of the vehicle; the springs 27, between the transverse arms and the end members of the chassis, are adapted to primarily support or compensate for the "live load", or lading of the vehicle; and the springs 24, interposed between the chassis and the connected ends of the supplemental frame arms, serve principally to compensate for vertical displacements of the ground wheels, in order to prevent the transmission of strains to the chassis and to maintain the chassis in substantially the same horizontal plane, irrespective of the displacements or vertical movements of the ground wheels under the influence of irregularities in the roadway traversed by the vehicle. For instance, referring to Figs. 2 and 3, and assuming that the rear, left ground wheel W encounters a depression in the roadway and tends to move downwardly and lower the chassis, the spring 24 at the left of Fig. 3 will elongate under downward movement of the pivotally connected ends of arms 13, 16. At the same time, the opposite ends of both of said arms, which are attached to the side sills and rear cross-members of the chassis, will also tend to be lowered, although not to the same degree. However, this slight movement of these ends of the auxiliary frame arms will be compensated for by elongation of the springs 23, 27, the expansion or elongation of these last-mentioned springs resulting in the chassis being maintained in its normal horizontal plane. In other words, the springs 24 elongate or give as the arms 13, 16, are lowered, while the springs 23 and 27 may be said to elongate and push up on the chassis to maintain the latter in its normal position. On the contrary, if the ground wheel should encounter an elevation on the roadway surface and tend to move upwardly, the several springs would yield, or be compressed, to compensate for this deflection of the wheel and thus avoid any change in the horizontal position of the chassis.

What I claim is:

1. In a vehicle comprising a chassis frame having rigid side sills and an end member connecting said sills, ground wheels, and an axle for said wheels, means for yieldingly supporting said frame on said wheels, said means comprising a longitudinally extending arm for each wheel pivoted at one end to a side sill, a transverse arm pivoted at one end on the opposite end of the longitudinal arm and pivotally attached at its opposite end to said end member, and springs interposed between said arms and frame, said springs being located adjacent points of attachment of the respective arms to the frame and adjacent the connection between the two arms, said axle being located intermediate the springs between the longitudinal arms and frame and the springs between the connected ends of the arms and frame.

2. In a vehicle comprising a chassis frame having rigid side sills and an end member, with ground wheels at each side of the frame and an axle for said wheels, means for yieldingly supporting the frame on said wheels, said means comprising arms pivoted to the side sills and supported on said wheels, dead load springs interposed between said arms and side sills at points adjacent the pivotal centers of said arms, transversely disposed arms pivoted to the first-mentioned arms and to the end member, live load springs interposed between the transverse arms and end member at points adjacent the pivotal connections between said arms and member, and additional springs interposed between the frame and said arms at points laterally outside the pivotal connections between the arms, said axle being disposed intermediate said additional springs and said dead load springs.

3. In a vehicle having a chassis frame comprising side sills and an end member rigidly connecting said side sills, ground wheels, and means for yieldingly supporting said frame on said wheels comprising arms pivoted at one end on the side sills with their free opposite ends extending toward the junction of the side sill and end member, transversely extending arms pivotally connected at one end to the free ends of the first-mentioned arms, the opposite end of each of said transverse arms being connected to the frame at a point beyond the longitudinal center of the frame, springs interposed between the frame and transverse arms adjacent said opposite ends of the transverse arms, said transverse arms having extensions projecting laterally beyond the point of their connection with the other arms, springs interposed between said frame and said extensions, springs interposed between said frame and the pivoted ends of the first-mentioned arms, and means for mounting the ground wheels in said first-mentioned arms at a point intermediate the last two mentioned sets of springs.

4. In a vehicle having a chassis frame comprising side sills and an end member rigidly connecting said sills, ground wheels, an axle for said wheels, and means for supporting said frame on said wheels, said means comprising longitudinal arms each pivotally supported at one end to one of the side sills, said axle being supported in said longitudinal arms intermediate the ends of the latter, a pair of transverse arms each pivotally supported at one end on said end member, the free ends of said longitudinal arms being pivotally attached to the transverse arms adjacent the free ends of the latter, extensions projecting laterally from the connected free ends of the transverse arms to a point beyond the side sills of the frame, springs interposed between each extension and said frame, and springs interposed between said frame and each arm adjacent the pivotally supported ends of the latter, the springs interposed between said frame and extensions and between said frame and the pivotally supported ends of the longitudinal arms being disposed at opposite sides fore and aft of said axle.

CHARLES E. BRADSHAW.